United States Patent [19]

Tajima

[11] Patent Number: 4,657,826

[45] Date of Patent: Apr. 14, 1987

[54] FUEL CELL SYSTEM FOR REPLACEMENT OF FUEL GAS

[75] Inventor: Hiroyuki Tajima, Kanagawa, Japan

[73] Assignee: Fuji Electric Company Ltd., Kawasaki, Japan

[21] Appl. No.: 849,394

[22] Filed: Apr. 8, 1986

[30] Foreign Application Priority Data

Apr. 10, 1985 [JP] Japan .................................. 60-75580

[51] Int. Cl.⁴ .............................................. H01M 8/06
[52] U.S. Cl. ........................................ 429/12; 429/17; 429/19; 429/20
[58] Field of Search ................... 429/12, 13, 17, 19, 429/20, 26

[56] References Cited

U.S. PATENT DOCUMENTS

| | | | |
|---|---|---|---|
| 4,075,396 | 2/1978 | Grehier ................................. | 429/17 |
| 4,473,622 | 9/1984 | Chludzinski et al. .............. | 429/19 X |
| 4,493,878 | 1/1985 | Horiba et al. ....................... | 429/12 |
| 4,555,452 | 11/1985 | Kahara et al. ....................... | 429/13 |

Primary Examiner—Anthony Skapars
Attorney, Agent, or Firm—Finnegan, Henderson, Farabow, Garrett & Dunner

[57] ABSTRACT

A fuel cell system for replacement of fuel gas includes a fuel cell having a fuel chamber, a fuel supply subsystem communicating with the fuel chamber of the fuel cell and a contact-type burner installed in the fuel supply subsystem for burning, with air, fuel derived from the fuel supply subsystem. At the time of start of operation of the fuel cell, in the operating state of the burner, a feed quantity of the fuel gas to be introduced into the burner is gradually increased while a feed quantity of the air to be introduced into the burner is decreased from 100% to 0% so that the air in the fuel chamber is replaced with the fuel gas. At the time of stop of operation of the fuel cell, in the operating state of the burner, the feed quantity of the fuel gas to be introduced into the burner is gradually decreased while the feed quantity of the air to be introduced into the burner is increased from 0% to 100% so that the fuel gas in the fuel chamber is replaced with the air.

4 Claims, 4 Drawing Figures

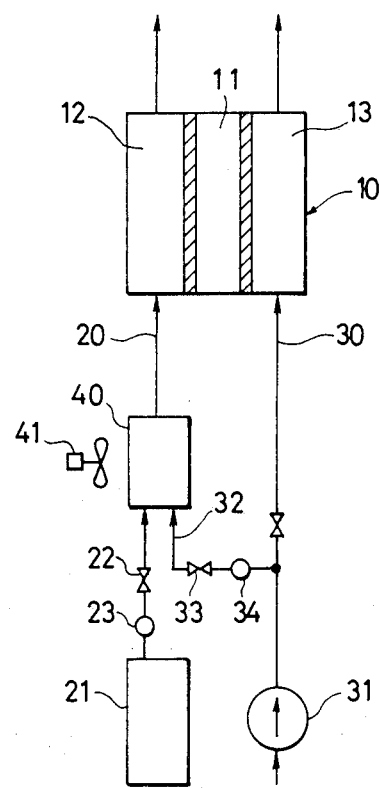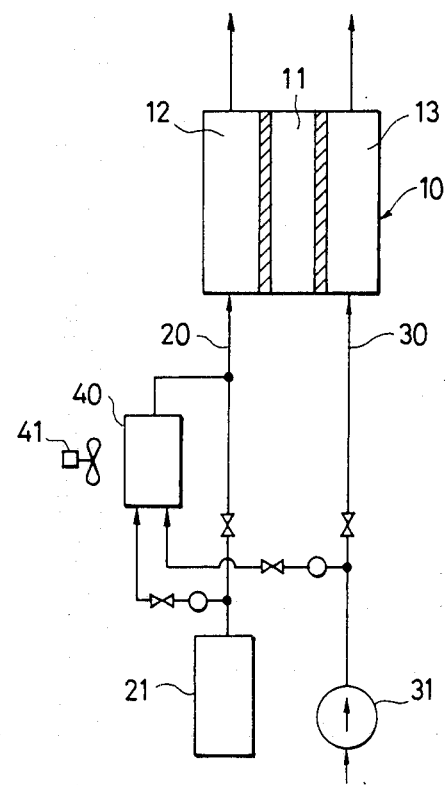

FUEL CELL SYSTEM FOR REPLACEMENT OF FUEL GAS

BACKGROUND OF THE INVENTION

This invention relates to a system for replacing fuel gas in the fuel feed system of a fuel cell with other gas at the time of start and stop of operation of the fuel cell.

It is well known that a fuel cell is made of a cell stack comprising plural single cells each composed of a pair of fuel electrode and oxidizing agent electrode between which an electrolyte is pinch-held. Fuel gas containing hydrogen and oxidizing agent such as air or oxygen are fed to the cell stack to generate electricity. Various fuel cells such as an alkaline type, a phosphoric acid type and a fused carbonate type, etc. are classified in accordance with the kinds of their electrolytes or operating temperatures. At the time of start and stop (including emergency stop) of operation of these fuel cells, the gases in fuel gas feed and discharge systems including the fuel cell bodies are generally replaced with inert gas such as nitrogen gas in order to secure safety. When the fuel cell whose operation has been stopped is put in operation again, detonating gas is likely to be produced and dangerously explode if the fuel gas is fed to the fuel cell having air or oxygen remaining in the fuel system of the fuel cell. When the operation of the fuel cell is stopped, the pressure of fuel gas is likely to decrease due to the internal discharge of the fuel cell, a temperature change of the fuel cell or the like so that air enters into the fuel system to produce detonating gas if the fuel gas is left in the body of the fuel cell. For these reasons, the gas replacement described above is performed in order to secure safety.

In order to perform the gas replacement in a conventional fuel cell equipment, the inert gas is previously stored in a storage tank such as a pressure container separately from the fuel and oxidizing agent feed systems of the fuel cell equipment. At the time of start and stop of operation of the fuel cell, the inert gas is fed from the storage tank to the reacting gas system of the fuel cell. Such a method requires not only the management of fuel but also requires other troublesome managements such as the monitoring of the quantity of the inert gas remaining in the storage tank, the securing of inert gas stockpile and the purchase or acquisition of the inert gas. As for a fuel cell equipment used as a portable power source in particular, a large storage tank for inert gas needs to be provided and conveyed together, which results in enlarging the whole equipment.

SUMMARY OF THE INVENTION

The present invention was made in consideration of the above-described problems.

Accordingly, it is an object of the present invention to provide a system for replacement of gases in the fuel system. In this system, the fuel gas or air in the fuel system of a fuel cell is safely replaced with the air or fuel gas at the time of stop and start of operation of the fuel cell, without using inert gas such as nitrogen gas as conventionally needed.

In order to achieve the object of the present invention, a contact-type burner, which causes the contact burning reaction of fuel gas with air under a catalytic action, is installed in a fuel gas feed line which connects a fuel gas source to the body of the fuel cell. At the time of start of operation of the fuel cell, in the operating state of the burner, the feed quantity of the fuel gas to be introduced into the burner is gradually increased while the feed quantity of the air to be introduced into the burner from the outside is decreased from 100% to 0%, so that the air is replaced with the fuel gas. At the time of stop of operation of the fuel cell, in the operating state of the burner, the feed quantity of the fuel gas is gradually decreased while the feed quantity of the air is increased from 0% to 100%, so that the fuel gas is replaced with the air.

During the process of the gas replacement described above, the inflammable constituents of the mixture of the fuel gas and the air are burned up at a low temperature by the contact burning reaction under the catalytic action in the burner so that detonating gas is not produced in the body of the fuel cell. The gas replacement is thus safely performed between the fuel gas and the air without using inert gas such as nitrogen gas as needed in a conventional method.

When the present invention is applied to a fuel cell equipment used as a portable power source, a large storage tank for storing inert gas does not need to be provided and conveyed together with the fuel cell equipment, so that the whole equipment is made compact.

According to the present invention, it is not necessary to store and manage inert gas. Therefore, the operational management of the fuel cell is simplified.

BRIEF DESCRIPTION OF THE DRAWINGS

FIG. 1 shows a systematic diagram of a fuel cell system according to a first embodiment of the present invention.

FIG. 2 shows a systematic diagram of a fuel cell system according to a second embodiment of the present invention.

DETAILED DESCRIPTION OF THE PREFERRED EMBODIMENTS

Figure 3:
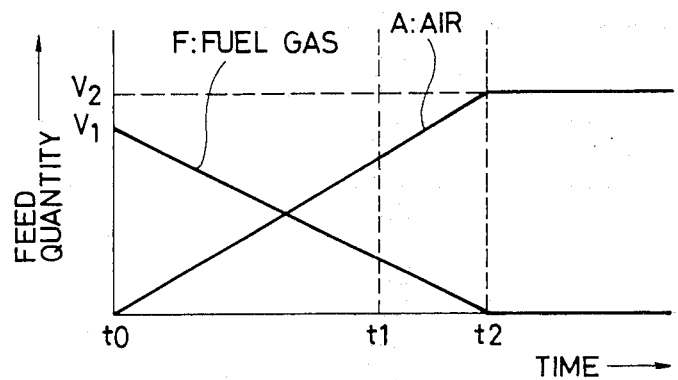
FIG. 3 shows a characteristic diagram of the time-related changes in the feed quantities of fuel gas and air so as to explain gas replacement which is performed at the time of stop of operation of the fuel cell in accordance with the present invention.

FIG. 1 shows a reacting gas feed system of fuel cell equipment according to a first embodiment of the present invention. In FIG. 1, a fuel cell body 10 comprises an electrolyte chamber 11, a fuel chamber 12 and an air chamber 13 in such a manner that the fuel chamber 12 and the air chamber 13 sandwich the electrodes on both sides of the electrolyte chamber 11, respectively. A fuel feed line 20 and an air feed line 30 are connected to the fuel chamber 12 and the air chamber 13, respectively, of the fuel cell body 10. A fuel gas storage tank 21 as a fuel source and an air blower 31 are connected to the fuel feed line 20 and the air feed line 30, respectively. Hydrogen-rich fuel gas, which is produced by converting fuel such as liquefied natural gas (LNG), liquefied petroleum gas (LPG), naphtha, methanol or the like through a water steam reformer and a carbon monoxide denaturalizer and comprises 80% of hydrogen and 20% of carbon dioxide, for example, is stored in the fuel gas storage tank 21 so that the hydrogen-rich fuel gas is fed to the fuel chamber 12 of the fuel cell body 10 through the fuel feed line 20 when the fuel cell is in operation. On the other hand, air is fed from the air blower 31 to the air chamber 13 of the fuel cell body 10 through the air feed line 30. Such constitution is the basic constitution of a conventional fuel cell.

According to the embodiment of the present invention as shown in FIG. 1, a contact-type burner 40 is further installed in series in the fuel feed line 20 connecting the fuel gas storage tank 21 to the fuel cell body 10. In the contact-type burner 40, a spherical catalyst made of an alumina carrier and containing 0.2% by weight of platinum is packed and a heater for heating the catalyst is provided. The fuel gas and the air are introduced into the contact-type burner 40 so that the fuel gas and the air are subjected to a contact burning reaction under the action of the catalyst in the burner 40. At that time, the hydrogen of the fuel gas reacts with the oxygen of the air at a temperature of 200° C. or less as the contact burning of the hydrogen advances. A cooling fan 41 is provided for the burner 40 so as to keep the temperature of the burning reaction at a prescribed level by preventing the burner from being overheated. The operation of the cooling fan 41 is controlled in accordance with the output of a temperature sensor provided in the burner 40, for example, so as to prevent the burner from being overheated. One inlet port of the burner 40 is connected to the fuel gas storage tank 21 through a fuel gas valve 22 and a fuel gas flow rate regulator 23. The other inlet port of the burner 40 is connected to the air blower 31 through an air pipe 32 branched from the air feed line 30, so that the air is introduced into the burner 40. An air valve 33 and an air flow rate regulator 34 are provided in the air pipe 32.

In the normal operation of the fuel cell, the burner 40 does not work, the air valve 33 is closed, the fuel gas is fed to the fuel chamber 12 of the fuel cell body 10 through the fuel valve 22 and the burner 40, and the air is fed from the air blower 31 to the air chamber 13 of the fuel cell body 10 through the air feed line 30, so that the fuel cell generates electricity.

When the operation of the fuel cell is stopped, electricity is applied to the heater to cause the contact-type burner 40 to work. The feed quantity of fuel gas to be introduced into the burner 40 is gradually decreased from 100% by the control action of the flow rate regulator 23 while the air valve 33 in the air pipe 32 is opened and the feed quantity of the air to be introduced into the burner 40 from the air blower 31 is gradually increased from 0% to 100% by the control action of the flow rate regulator 34, as the burner 40 is working. At that time, the mixture of the fuel gas and the air is subjected to the contact burning in the burner 40, and the fuel gas to be fed into the fuel chamber 12 of the fuel cell body 10 through the fuel feed line 20 is replaced with the air.

Figure 4:
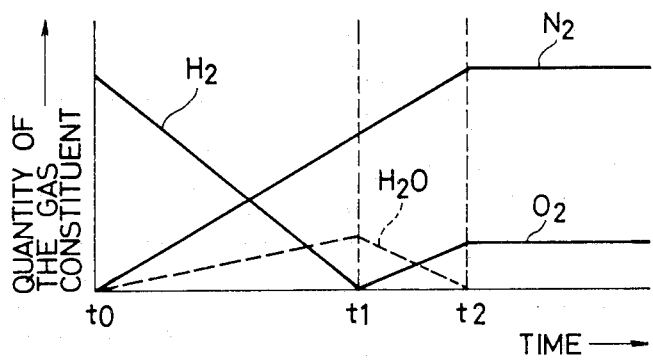
FIG. 4 shows a characteristic diagram of the time-related changes in the quantities of gas constituents so as to explain gas replacement which is performed at the time of stop of operation of the fuel cell in accordance with the present invention.

The above-described gas replacement at the time of stop of operation of the fuel cell will be described hereinafter in more detail with reference to FIGS. 3 and 4. FIG. 3 shows the time-related changes in the feed quantitites of the fuel gas and the air which are fed to the contact type burner 40. FIG. 4 shows the time-related changes, in the quantities of gas constituents, which are caused by the contact burning reaction in the burner 40. In FIG. 3, F denotes the feed quantity of the fuel gas to be introduced into the burner and A denotes the feed quantity of the air to be introduced into the burner. At the time point $t_0$ of the beginning of the gas replacement at the stop of operation of the fuel cell, the feed quantity of the fuel gas is $V_1$ and the feed quantity of the air is O. After the time point $t_0$, the feed quantity of the fuel gas is decreased in a rectilinear manner to become O at a time point $t_2$, by the control action of the flow rate regulator 23, as shown by a line F. The feed quantity of the air is increased in a rectilinear manner from O to $V_2$ in correspondence with the decrease in the feed quantity of the fuel gas, by the control action of the flow rate regulator 34, as shown by a line A. At a time point $t_1$ between the time points $t_0$ and $t_2$, the ratio of the hydrogen of the fed fuel gas to the oxygen of the fed air is set at 1 so that the hydrogen of the fed fuel gas is completely burned. Before the time point $t_1$, the feed quantity of the fuel gas is excess and the oxygen of the air introduced into the burner 40 is all consumed in the contact burning reaction so that gas containing no oxygen is fed to the fuel cell body 10. After the time point $t_1$, the feed quantity of the air is excess and the hydrogen of the fuel gas is all consumed in the contact burning reaction with the oxygen of the air at a low temperature so that gas not containing hydrogen which is inflammable is fed to the fuel cell body 10. As a result, no detonating gas is produced in the fuel cell body 10. The fuel gas is thus safely replaced with the air. As shown in FIG. 4, the quantities of gas constituents change in the process of the gas replacement. The hydrogen of the fuel gas decreases due to the contact burning reaction, to the time point $t_1$, as shown by a line $H_2$. In contrast, water steam produced in the contact burning reaction of the hydrogen of the fuel gas with the oxygen of the air increases to the time point $t_1$, as shown by a line $H_2O$. After the time point $t_1$, the air becomes excess over the fuel gas so that the unconsumed oxygen from the air increases gradually, as shown by a line $O_2$ and the water steam produced in the burning reaction decreases and becomes O at the time point $t_2$. A line $N_2$ in FIG. 4 shows the quantity of the nitrogen of the fed air. The nitrogen increases as the feed quantity of the air increases. After the time point $t_2$, the feed quantity of the air is kept at $V_2$, as shown in FIG. 3, so that the quantities of the oxygen and nitrogen of the air are fixed according to the composition of the air. The carbon dioxide in the fuel gas decreases along with the reduction of the feed quantity of the fuel gas, and becomes O at the time point $t_2$. The above-mentioned water steam can be easily removed, if necessary, by installing a dehumidifier to the contact-type burner 40.

When the operation of the fuel cell is started from its state of being stopped where the fuel system of the fuel cell body is full of the air, the feed quantity of the fuel gas to be introduced into the burner is gradually increased from O while the feed quantity of the air to be introduced into the burner is decreased from 100% to 0% in the working state of the burner 40, so that the air in the fuel system of the fuel cell body is replaced with the fuel gas. In this case, the lines F and A shown in FIG. 3 should be considered denoting the feed quantity of the air and the feed quantity of the fuel gas, respectively. Before the time point when the ratio of the hydrogen of the fuel gas to the oxygen of the air becomes 1, the feed quantity of the air is excess so that the hydrogen of the fed fuel gas is all consumed in the contact burning reaction. After that time point, the feed quantity of the fuel gas is excess so that the oxygen of the fed air is all consumed in the contact burning reaction. As a result, no detonating gas is produced in the fuel cell body 10. The air is thus safely replaced with the fuel gas.

Though the fuel gas comprising hydrogen and carbon dioxide is adopted in the above-described embodiment, other fuel gas containing inflammable gas such as carbon monoxide, methane and propane other than hydrogen can be also adopted to be subjected to the contact burning reaction at a low temperature under the action of the catalyst.

FIG. 2 shows a second embodiment according to the present invention. Elements corresponding functionally to those in the first embodiment are designated by like reference numerals or characters. While the contact-type burner 40 is installed in series in the fuel feed line 20 in the first embodiment as shown in FIG. 1, the contact-type burner 40 is coupled in parallel with the fuel feed line 20 through a changeover valve according to the second embodiment shown in FIG. 2. Only when the gas replacement is performed, the contact-type burner 40 is caused to communicate with the fuel feed line 20. After the gas replacement has been performed, the fuel gas is directly fed to the fuel cell body without passing through the contact-type burner 40. For that reason, according to the second embodiment as shown in FIG. 2, the burner 40 can be removed for checks and maintenance, if necessary, during the operation of the fuel cell.

It will be obvious to those skilled in the art that many modifications may be made within the scope of the invention without departing from the spirit thereof, and the invention includes all such modifications.

What is claimed is:

1. A fuel cell system for replacement of fuel gas comprising;

a fuel cell having a fuel chamber;

a fuel supply subsystem communicating with said fuel chamber; and burning means provided in said fuel supply subsystem for burning, with air, fuel gas derived from said fuel supply subsystem, wherein at the time of start of operation of said fuel cell, a feed quantity of the fuel gas to be introduced into said burning means is gradually increased while a feed quantity of the air to be introduced into said burning means is decreased from 100% to 0% during working of said burning means so that the air in said fuel chamber is replaced with the fuel gas, and at the time of stop of operation of said fuel cell, the feed quantity of the fuel gas to be introduced into said burning means is gradually decreased while the feed quantity of the air to be introduced into said burning means is increased from 0% to 100% during working of said burning means so that the fuel gas in said fuel chamber is replaced with the air.

2. The system according to claim 1, wherein said burning means is caused to communicate with said fuel chamber, only when the gas replacement is performed at the time of start and stop of operation; and the fuel gas is fed directly to said fuel chamber without passing through said burner, after the gas replacement has been performed at the time of start of operation of said fuel cell.

3. The system according to claim 1, wherein said burning means is of the contact type causing contact burning reaction of the fuel with the air under a catalytic action.

4. The system according to claim 2, wherein said burning means is of the contact type causing contact burning reaction of the fuel with the air under a catalytic action.

* * * * *